UNITED STATES PATENT OFFICE.

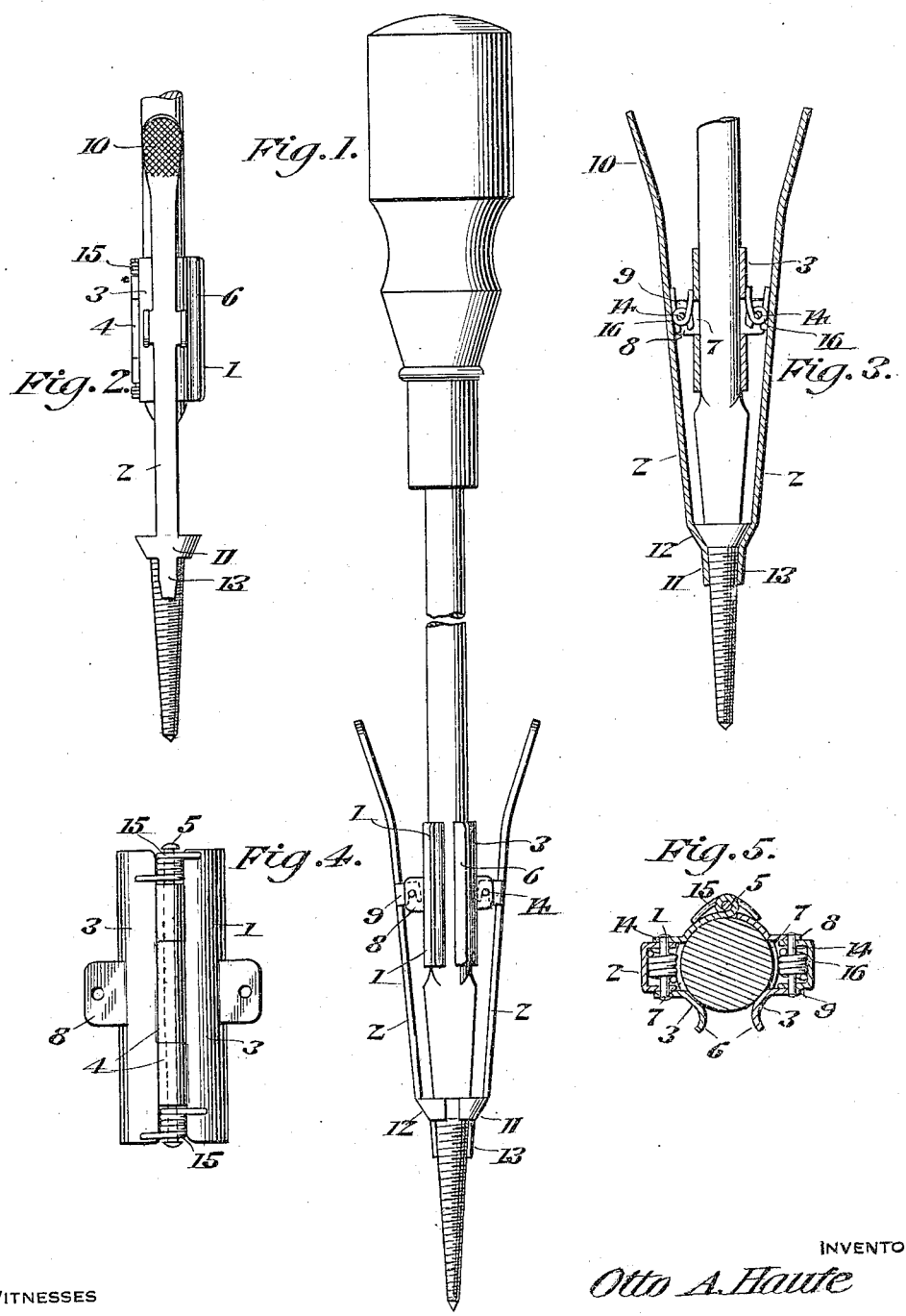

OTTO A. HAUFE, OF SECAUCUS, NEW JERSEY.

SCREW-HOLDING ATTACHMENT FOR SCREW-DRIVERS.

1,240,138.  Specification of Letters Patent.  Patented Sept. 11, 1917.

Application filed March 24, 1917. Serial No. 157,160.

*To all whom it may concern:*

Be it known that I, OTTO A. HAUFE, a citizen of the United States, residing at Secaucus, in the county of Hudson and State of New Jersey, have invented new and useful Improvements in Screw-Holding Attachments for Screw-Drivers, of which the following is a specification.

This invention relates to improvements in screw drivers and especially with reference to the provision of a screw holding device which may be readily attached to an ordinary screw driver and which serves to seize and hold the shank of the screw just below the head and prevent the screw driver from becoming detached from the screw while being used to sink the latter.

A further object of the invention is to provide an improved attachment of this kind which is extremely simple in construction, which may be manufactured at very slight cost and which may be readily attached to or detached from a screw driver.

The invention consists in the construction, combination and arrangement of devices hereinafter described and claimed.

In the accompanying drawings:—

Figure 1 is an elevation of a screw driver provided with a screw holding attachment constructed and arranged in accordance with my invention.

Fig. 2 is a similar view of the same at right-angles to Fig. 1.

Fig. 3 is a sectional view of the same.

Figs. 4 and 5 are detailed views.

My improved screw holding attachment for screw drivers embodies a band or body 1 which is adapted to be clamped around the shank of a screw driver and also embodies a pair of levers 2 which are pivotally mounted on opposite sides of the clamping band and are provided with jaws for engaging under the head of a screw to hold the latter to the screw driver and prevent the casual detachment of the screw driver while using the latter to sink the screw. The clamping band in the embodiment of the invention here shown comprises a pair of substantially semi-cylindrical members 3 which may be made of sheet metal and which are provided at one side with tubular lugs 4 arranged in over-lapping relation and through which a pintle rod 5 extends so that the said members are hingedly connected together. Each member 3 is provided at the side or end opposite the pintle rod with a reversely bent outwardly turned portion 6 the said portions being adapted to be grasped by the fingers when placing the attachment on or removing the same from the screw driver. Each member 3 is provided at its central portion with an opening 7 and with a pair of outwardly projecting spaced lugs 8, the said lugs being formed integral with and stamped out with the said members, at the sides of said openings. The clamping band or body is here shown as substantially cylindrical in form, but I would have it understood that the same may be made of any suitable shape and of any suitable size according to the size and shape of the shank of the screw driver on which the attachment is to be used.

Each lever 2 is also formed from a single piece of sheet metal and is stamped to form a pair of lugs 9 at a point intermediate the ends and to form a handle 10 at the inner end and a jaw 11 at the outer end. Each body has an offset 12 to engage under the head of the screw and an extended portion 13 to bear against one side of the shank of the screw The lugs 9 of the levers are arranged between the lugs 8 of the members 3 and are engaged with pivots 14 which pass through said lugs 8 and 9 and serve to pivotally connect the levers to the members 3.

Coil springs 15 have their coiled portions arranged on the pintle rod 5 and have their ends extended and engaged with the members 3 so that said springs serve to close the members 3 and to clamp them firmly around and on the shank of the screw driver by enabling the members 3 to be opened to permit the removal of the device from the screw driver.

Similar springs 16 are arranged on the pivots 14 and each has one end engaged with one of the clamping members 3 and the other end engaged with one of the levers, said springs 16 serving to close the jaws of the levers against offset sides of the shank of the screw and under the head thereof.

While I have herein shown and described a preferred form of my invention I would have it understood that changes may be made in the form, proportion and construction of the several parts, without departing from the spirit of my invention and within the scope of the appended claims.

Having thus described my invention, I claim:—

1. A screw holding attachment for screw drivers comprising a body adapted to be arranged around and secured to a screw driver and comprising a pair of pivotally connected members, a pair of levers each pivotally connected to one of the body members and provided with a screw engaging jaw, and springs acting on said levers to close said jaw.

2. A screw holding attachment for screw drivers comprising a body adapted to be arranged around and secured to a screw driver and comprising a pair of pivotally connected members, a pair of levers each pivotally connected to one of the body members and provided with a screw engaging jaw, and springs acting on said levers to close said jaw, the said body of the attachment being provided with a spring to close the body members and clamp the same on the screw driver.

3. A screw holding attachment for screw drivers comprising a body adapted to be arranged around and secured to a screw driver and comprising a pair of pivotally connected members, a pair of levers each pivotally connected to one of the body members and provided with a screw engaging jaw, and springs acting on said levers to close said jaw, each of the body members being constructed of sheet metal and provided with a pair of spaced outstanding lugs, and each of the said levers being also constructed of sheet metal and provided with lugs for arrangement between the lugs of the body members and engagement by a pivot.

In testimony whereof I affix my signature.

OTTO A. HAUFE.

Copies of this patent may be obtained for five cents each, by addressing the "Commissioner of Patents, Washington, D. C."